April 18, 1944.  E. L. BAILEY  2,347,071
FLUID COUPLING
Original Filed Aug. 24, 1940
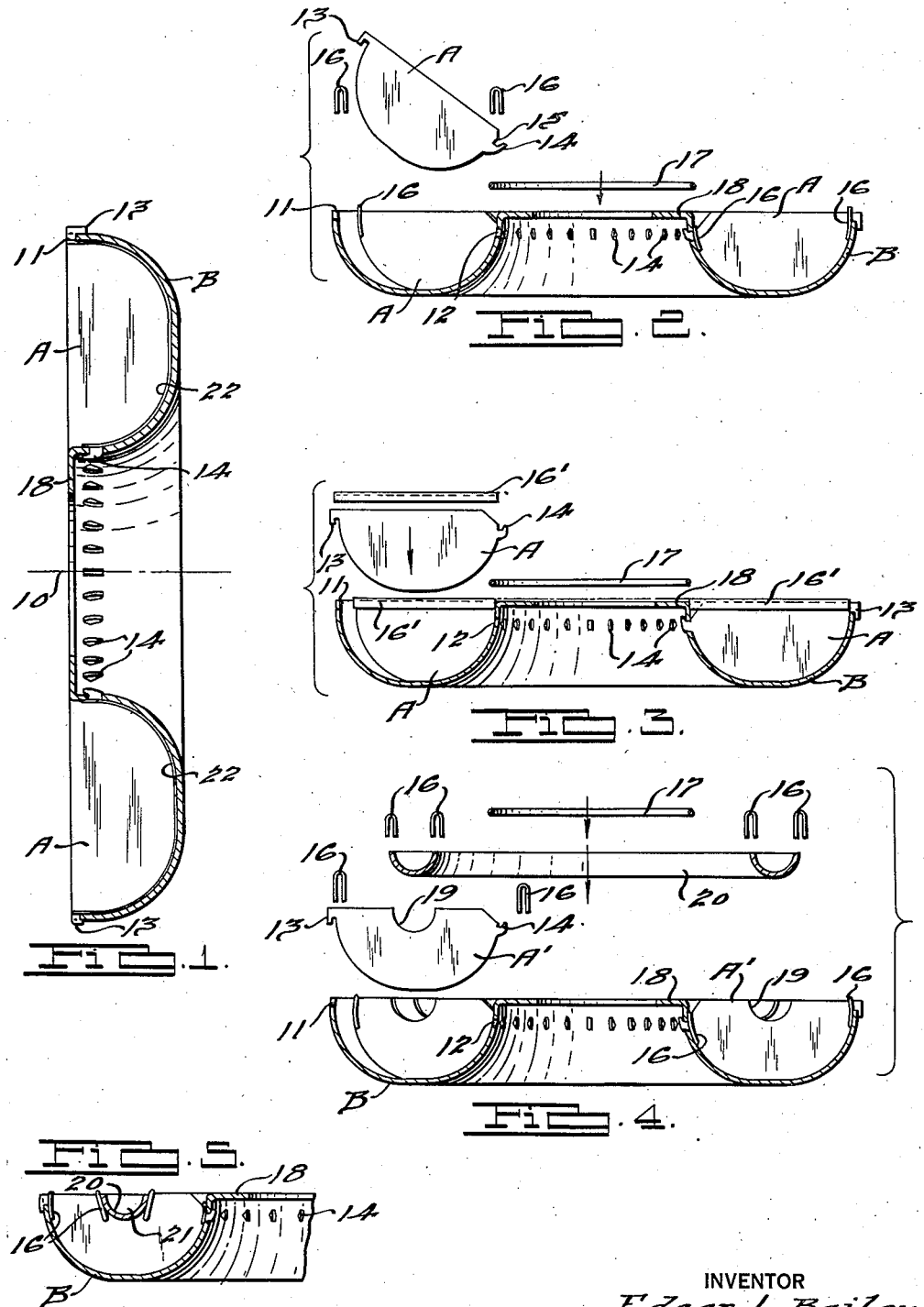
INVENTOR
Edgar L. Bailey.
BY
ATTORNEYS Patented Apr. 18, 1944

2,347,071

UNITED STATES PATENT OFFICE 2,347,071

FLUID COUPLING

Edgar L. Bailey, Birmingham, Mich., assignor to Chrysler Corporation, Highland Park, Mich., a corporation of Delaware Original application August 24, 1940, Serial No. 354,015. Divided and this application April 24, 1941, Serial No. 390,019

4 Claims. (Cl. 103—115)

This invention relates to fluid drive-transmitting devices and refers more particularly to improvements in the fabrication or assembly of such devices.

One type of fluid driving devices which I have chosen to illustrate the principles of my invention is known as a fluid coupling of the Föttinger type although my invention is not limited in its broader aspects to any particular type of fluid coupling. For example, my invention is applicable to fluid couplings of the torque multiplying type or other types wherein the driving and driven members of the device comprise vaned fluid conducting passages.

This application is a division of my copending application Serial No. 354,015, filed August 24, 1940, and is particularly directed to my improved construction of fluid coupling as distinguished from my method of fabricating the coupling which forms the subject matter of said copending application. Inasmuch as the fluid coupling construction facilitates the method of fabrication, I will include a description of this method in the subject application.

Inasmuch as the fluid coupling driving and driven members are formed of a plurality of vaned passages, the fabrication of the coupling members presents a variety of problems incident to economical production of couplings on a quantity basis. Cast couplings have not proven satisfactory for automotive installations owing to excessive weight, cost and variation in the density of the cast metal giving rise to bursting of the couplings at high speed. It is therefore preferred to fabricate the coupling members of steel stampings and this is generally done by providing each of the vanes with tabs which are individually welded to the dished vane-carrying cover. Such practice entails a large number of welds and is slow and costly.

It is an object of my invention to provide an improved coupling member so constructed as to facilitate welding or brazing of the component parts.

An additional object is to provide improvements in fluid coupling fabrication whereby distortion is guarded again.

Another object is to provide simple means adapted for efficient manufacture for facilitating the location of the coupling vanes during assembly thereof, and to provide means for utilizing the vanes as tie members for the coupling housing or shell preparatory to brazing as well as in normal use thereafter.

An additional object is to provide a coupling member which presents a smooth fluid flow circuit whereby efficient operation of the coupling is obtained.

Additional objects and advantages of my invention will be more apparent from the following specification of certain typical illustrative embodiments thereof, reference being made to the accompanying drawing in which:

Fig. 1 is a sectional elevational view of a coupling member after assembly of the vanes and subsequent to the brazing process.

Fig. 2 is a sectional elevational view illustrating the manner of assembly of the vanes and bonding metal for a coupling member preparatory to the brazing process.

Fig. 3 is a similar view illustrating a modified form of bonding metal.

Fig. 4 is a similar view but illustrating a slightly modified form of coupling member.

Fig. 5 is a fragmentary sectional view showing a portion of the Fig. 4 coupling member with the parts assembled ready for brazing.

Referring to the drawing, I have illustrated the principles of my invention in connection with a simple form of fluid coupling of the type having planar or non-curving vanes A extending radially from the axis of rotation 10, the vanes being circumferentially spaced from each other in the vane-carrying hemi-toroidal cover or housing B. The dished cover B forms a wall for the various fluid conducting vane passages defined by the spaces between adjacent vanes. The illustrated coupling member may be either the impeller or the runner of a fluid coupling, it being understood that a pair of the coupling members, each of which may be of the type shown in Fig. 1, are juxtaposed in driving relationship with the open portions of the vane passages facing each other. The coupling members are secured to their respective shafts (not shown) or other structures between which it is desired to transmit drive through the fluid coupling.

I have provided means cooperating between the vanes A and cover B to quickly and securely position the vanes in proper position preparatory to the brazing process, the cover being thereby also reinforced by employing the vanes to tie the inner and outer regions of the dished cover mechanically together against warping during the brazing process. To this end the cover is provided with a series of circumferentially spaced slots 11 at the outer periphery thereof and a second series of circumferentially spaced slots or openings 12 adjacent the inner periphery thereof. For the type of vanes illustrated, pairs of the slots 11 and 12 are in approximate radial alignment for respectively receiving the outer and inner hook-like projections 13 and 14 of a vane A. Each slot 12 is marginally surrounded by the material forming the body of cover B whereas each slot 11 is marginally open upwardly as viewed in Fig. 2. The hooks 13 and 14 extend in opposite directions generally in the direction of axis 10 and each hook 14 forms an approximate V-notch at 15 with the inner peripheral edge of its vane A.

In assembling the vanes, the cover B is preferably placed on a suitable support positioned as in Fig. 2 with the dished or concave working chamber facing upwardly and then the vanes A are assembled in place. Each vane A is assembled by engaging its hook 14 in a slot 12, the vane being tilted by raising the outer end as illustrated in Fig. 2. The notch 12 will accommodate entry of hook 14 in its notch and then the outer end of the vane is lowered to engage the hook 13 in a slot 11, the projecting portions of the hooks 13 and 14 engaging the outer surface of cover B in interlocking relationship therewith whereby the vanes act as tension members securely holding the housing against warping. By preference the vane edges at the hook portions also engage the inner surface of the housing.

When the vanes have been assembled then the bonding metal is placed in position preparatory to brazing. This brazing is effected in a suitable non-oxidizing atmosphere and in itself is well known commercially. A convenient atmosphere is hydrogen and the art of hydrogen welding is well known. The bonding metal is preferably copper or a suitable alloy of copper and is positioned so that when subjected to heat the copper will flow along the contacting surfaces between the vanes A and housing B thereby forming a weld or fused bond with the iron in the steel stampings of the vanes and housing. For convenience the bonding metal may be referred to as copper although any alloy may be used which is suitable for the brazing in the reducing atmosphere.

The bonding copper may be conveniently applied as a return bent element 16. Any number of these elements may be suspended on the upper edge of each vane A when positioned as in Fig. 2. In this view I have shown two of these hairpin-like elements 16 for each vane, the elements being respectively applied adjacent the hooks 13 and 14. In addition, a ring of copper 17 may be applied around the attaching hub portion 18 of cover B, this copper ring resting in the notch 15 as shown in Fig. 5. In Fig. 3 the return bent elements are in the form of channels 16' which respectively rest on the upper edges of vanes A. In Fig. 4 the vanes A' are each recessed at 19 to receive an inner dished hemi-toroidal stamping 20 where it is desired to provide a vortex chamber portion 21 for the coupling member. In Fig. 4, assuming that the hairpin elements 16 of Fig. 2 are employed, then additional elements 16 are assembled on each vane adjacent ring 20 to insure flow of the copper at the contacting surfaces between ring 20 and recesses 19. In the assembly of the vanes for the Fig. 3 and Fig. 4 modifications it will be understood that these vanes are tilted as in Fig. 2 in first engaging the inner hooks 14 prior to dropping the vanes in their ultimate positions with the outer hooks 13 engaging slots 11.

After the vanes have been assembled as aforesaid, along with the bonding metal and ring 20 when employed, the assembly is subjected to the hydrogen welding process. This usually comprises placing the assemblies, while positioned as in Fig. 5 for example, on a heat resisting conveyor and passing the assemblies through the non-oxidizing atmosphere, usually hydrogen. While the practice may vary as desired and is in general well known in the art, the hydrogen atmosphere is usually in the neighborhood of 2000° F. The assemblies are subjected to this heated atmosphere for around twenty minutes and then allowed to slowly cool down over about forty minutes to room temperature while still in the hydrogen atmosphere to prevent oxidizing.

During the aforesaid hydrogen copper brazing process, the copper melts and flows by capillary attraction so that the copper finds its way around the inside of cover B at the engagement therewith by the vanes A, also at the contacts between the cover and hooks 13 and 14 as well as between the inner cover 20 and vanes A' in the case of the Fig. 4 embodiment. The copper fuses with the iron at the junctures of the cover and vanes and forms a secure weld of these parts. This forms a copper-iron alloy film 22 between adjacent surfaces of the vanes and cover. During the brazing process the vanes hold the cover B against warping and particularly against radial expansion incident to relief of the cooling strains in the steel cover B.

After the brazing process has been completed, the coupling member is ready for operative assembly with its companion coupling member although, if desired, the projecting portions of the hooks 13 and 14 may be ground off flush with the outer surface of the cover B.

I claim:

1. A vaned fluid drive-transmitting structure comprising a cover having a hemi-toroidal dished fluid circulating chamber provided with inner and outer peripheral bounding portions, each of said bounding portions being formed with an annular series of slots, a plurality of vanes adapted for positioning in circumferentially spaced relationship with respect to each other in said dished chamber, each of said vanes having a hook-like projection adapted to engage a slot of one of said series, each of said vanes having a second hook-like projection, the projections of each of said vanes extending in relatively opposite directions and being so constructed and arranged that the second said hook-like projection of each of said vanes will engage a slot of the other of said series thereby providing interlocking connection of the vanes with said cover.

2. A vaned fluid drive-transmitting structure comprising a cover having a hemi-toroidal dished fluid circulating chamber provided with inner and outer peripheral bounding portions, each of said bounding portions being formed with an annular series of slots, one of said bounding portions having its said series of slots formed in the margin thereof whereby these slots are marginally open, a plurality of vanes adapted for positioning in circumferentially spaced relationship with respect to each other in said dished chamber, each of said vanes having a pair of hook-like projections extending in relatively opposite directions, each of said vanes comprising a substantially flat body portion from which said hook-like portions extend so as to lie approximately in a common plane containing said body portion.

3. A vaned fluid drive-transmitting structure comprising a cover having a hemi-toroidal dished fluid circulating chamber formed with oppositely disposed inner and outer boundary walls, each of said walls being formed with an annular series of slots, a plurality of vanes disposed on edge in circumferentially spaced relationship with respect to each other in said chamber, the surfaces of said vanes extending across said chamber from one wall to the other wall and between the slots formed therein, each vane having a hook-like projection extending from opposite sides thereof and constituting an extension of the surface of the vane, the projection on one side entering one slot and engaging the exterior of the wall in which said slot is formed, the projection on the other side of the vane entering a slot formed in the opposite wall and engaging the exterior of said wall, thereby to provide, without distortion of said projections with respect to the surface of said vane, an interlocking connection between the vanes and cover.

4. A vaned fluid drive-transmitting structure comprising a hemi-toroidal dished fluid circulating chamber provided with inner and outer oppositely disposed peripheral boundary walls, one of said walls being formed with an annular series of slots extending therethrough such that each slot is marginally surrounded by the material of said wall, the other of said walls being formed with another annular series of slots therein such that each is marginally open, a plurality of vanes positioned in circumferentially spaced relationship with respect to each other in said dished chamber and between said walls, each of said vanes having a hook-like projection on opposite sides thereof, said projections being continuations of the natural surface of the vanes, said projections entering a slot on each wall and engaging the surface thereof to form interlocking connections between the vanes and cover, said projections and slots engaged thereby being located in a common line whereby the marginally surrounded slot is a center of rotation for the said vane and other projection in a path including the marginally open slot.

EDGAR L. BAILEY.